(12) United States Patent
Smith

(10) Patent No.: US 11,552,890 B2
(45) Date of Patent: Jan. 10, 2023

(54) ENHANCED ENTROPY FOR A CONVERGED INTERCONNECT NETWORK

(71) Applicant: Cisco Technology, Inc., San Jose, CA (US)

(72) Inventor: Andrew Judson Smith, Malvern, PA (US)

(73) Assignee: Cisco Technology, Inc., San Jose, CA (US)

(*) Notice: Subject to any disclaimer, the term of this patent is extended or adjusted under 35 U.S.C. 154(b) by 30 days.

(21) Appl. No.: 17/173,728

(22) Filed: Feb. 11, 2021

(65) Prior Publication Data

US 2022/0255861 A1    Aug. 11, 2022

(51) Int. Cl.
| | |
|---|---|
| *H04L 12/46* | (2006.01) |
| *H04L 12/741* | (2013.01) |
| *H04L 29/12* | (2006.01) |
| *H04L 45/74* | (2022.01) |
| *H04L 61/5007* | (2022.01) |

(52) U.S. Cl.
CPC .......... *H04L 45/74* (2013.01); *H04L 12/4633* (2013.01); *H04L 61/5007* (2022.05)

(58) Field of Classification Search
CPC .. H04L 12/4633; H04L 45/74; H04L 61/5007
See application file for complete search history.

(56) References Cited

U.S. PATENT DOCUMENTS

| | | | | |
|---|---|---|---|---|
| 9,130,769 B2* | 9/2015 | Chapman | ......... | H04N 21/64322 |
| 9,246,701 B2* | 1/2016 | Chapman | ......... | H04N 21/6168 |
| 9,692,563 B2* | 6/2017 | Liu | ...... | H04L 27/3405 |
| 10,536,367 B2* | 1/2020 | Pignataro | ...... | H04L 45/16 |
| 10,728,595 B2* | 7/2020 | Gotwals | ...... | H04L 12/2801 |
| 10,911,210 B2* | 2/2021 | Liu | ...... | H04L 12/2801 |
| 11,044,227 B1* | 6/2021 | Bonen | ...... | H04Q 11/0067 |
| 11,290,761 B2* | 3/2022 | Zinevich | ...... | H04N 21/2402 |
| 2009/0041058 A1* | 2/2009 | Ikeda | ...... | H04L 29/12216 |
| | | | | 370/475 |
| 2015/0334467 A1 | 11/2015 | Chapman | | |
| 2016/0366052 A1* | 12/2016 | Chapman | ...... | H04L 45/66 |
| 2017/0244577 A1* | 8/2017 | Patrick | ...... | H04L 12/4641 |
| 2018/0145746 A1 | 5/2018 | Finkelstein | | |

(Continued)

FOREIGN PATENT DOCUMENTS

WO    2019152942    8/2019

*Primary Examiner* — Alpus Hsu

(74) *Attorney, Agent, or Firm* — Polsinelli

(57) ABSTRACT

Systems, methods, and computer-readable media are provided for introducing entropy in a Converged Interconnect Network. For instance, a remote physical layer device (RPD) can receive a first plurality of Internet Protocol (IP) addresses that are assigned to the RPD. The RPD can receive, from a Converged Cable Access Platform Core (CCAP-Core) device, a first data packet having a first destination IP address selected from the first plurality of IP addresses. The RPD can receive, from the CCAP-Core device, a second data packet having a second destination IP address selected from the first plurality of IP addresses. In some examples, a difference between the first destination IP address and the second destination IP address can cause a router disposed between the CCAP-Core device and the RPD to select a first route for the first data packet and a second route for the second data packet.

20 Claims, 6 Drawing Sheets

(56) References Cited

U.S. PATENT DOCUMENTS

| | | | |
|---|---|---|---|
| 2018/0351767 A1* | 12/2018 | Patrick | H04L 12/4633 |
| 2019/0036785 A1 | 1/2019 | Pfeffer | |
| 2019/0281362 A1* | 9/2019 | Wiley | H04L 12/2869 |
| 2019/0289038 A1* | 9/2019 | Li | H04L 63/205 |
| 2019/0386871 A1* | 12/2019 | Quan | H04L 12/2865 |
| 2020/0245346 A1* | 7/2020 | Chapman | H04W 72/1236 |
| 2020/0274948 A1* | 8/2020 | Yang | H04L 29/08 |
| 2021/0160091 A1* | 5/2021 | Foley | H04N 21/6168 |

* cited by examiner

ENHANCED ENTROPY FOR A CONVERGED INTERCONNECT NETWORK

TECHNICAL FIELD

The present technology relates generally to cable network communications, and more specifically, to providing enhanced entropy in a Converged Interconnect Network.

BACKGROUND

The demand for bandwidth by consumers of cable services continues to increase due to the growth of applications that include video streaming services, online gaming, video conferencing, telephone communications, etc. To address the increased demand for bandwidth, cable network operators have transitioned to a Distributed Access Architecture (DAA) in which functions that were previously located at the cable operator's headend or hub are relocated to nodes that reside closer to the cable subscriber. The network that provides connectivity between the cable operator's headend and the subscriber nodes is known as a Converged Interconnect Network (CIN).

Data that travels across the CIN is encapsulated into Data-Over-Cable Service Interface Specification (DOCSIS) frames and travels over IP-based tunnels or pseudowires. The CIN can include both Layer 2 switches and Layer 3 routers. The routers in the CIN make routing decisions based on the source and destination Internet Protocol (IP) addresses that are associated with the DOCSIS frames and correspond to network components located at the headend or hub and at subscriber nodes.

BRIEF DESCRIPTION OF THE DRAWINGS

In order to describe the manner in which the various advantages and features of the disclosure can be obtained, a more detailed description will be rendered by reference to specific embodiments which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
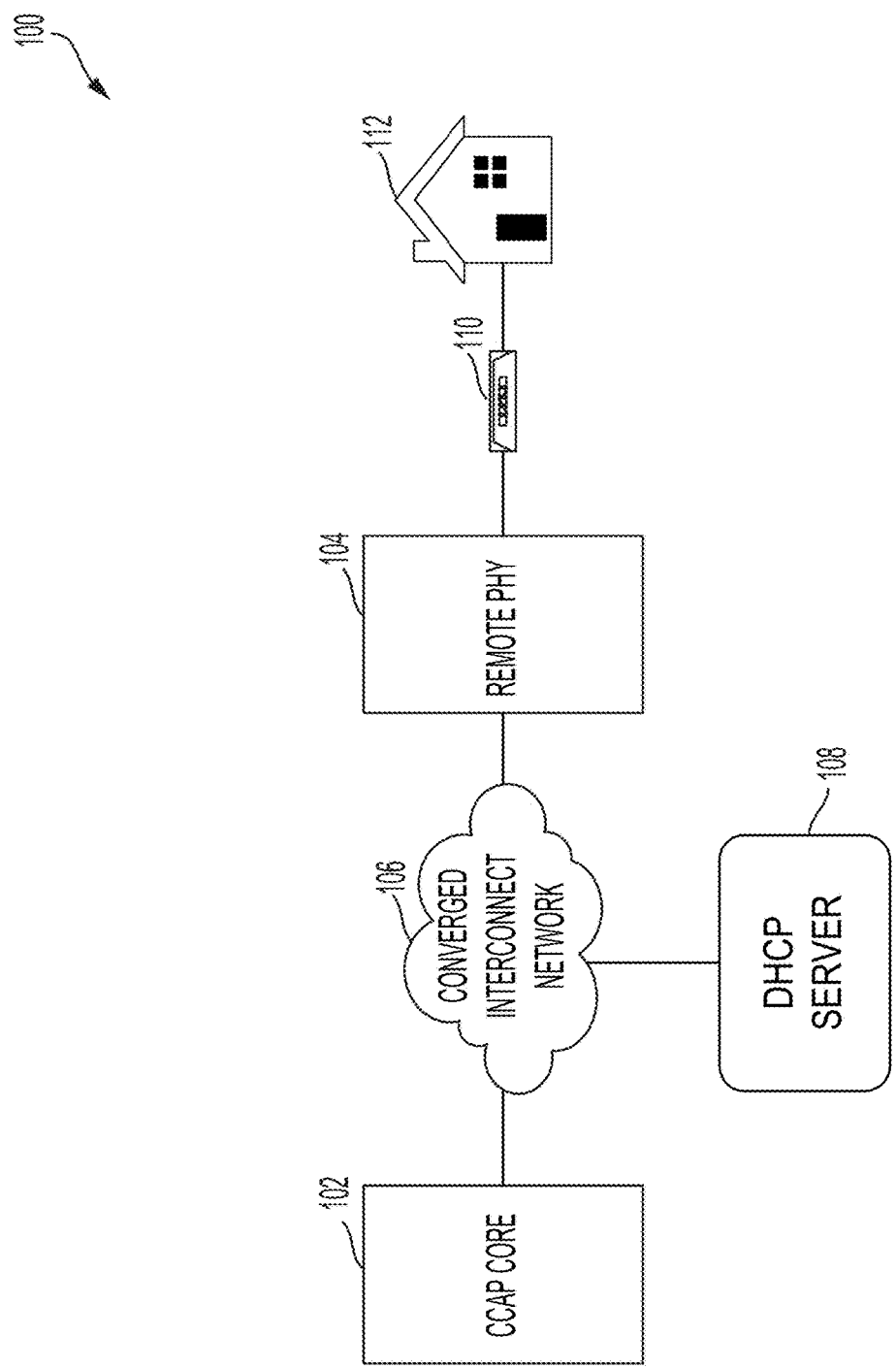
FIG. 1 is a block diagram illustrating an example network architecture, in accordance with some examples.

Various embodiments of the disclosure are discussed in detail below. While specific implementations are discussed, it should be understood that this is done for illustration purposes. A person skilled in the relevant art will recognize that other components and configurations may be used without parting from the spirit and scope of the disclosure. Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

OVERVIEW

Disclosed herein are systems, methods, and computer-readable media for providing entropy in a converged interconnect network. According to at least one example, a method for providing enhanced entropy in a converged interconnect network is provided. The method can include, receiving, by a remote physical layer device (RPD), a first plurality of Internet Protocol (IP) addresses that are assigned to the RPD; receiving, by the RPD from a Converged Cable Access Platform Core (CCAP-Core) device, a first data packet having a first destination address selected from the first plurality of IP addresses; and receiving, by the RPD from the CCAP-Core device, a second data packet having a second destination address selected from the first plurality of IP addresses.

In at least some examples relating to the method described above, the first plurality of addresses can include an Internet Protocol version 6 (IPv6) prefix.

In at least some aspects, the method described above can include sending, from the RPD to a Dynamic Host Configuration Protocol (DHCP) server, a request for the first plurality of IP addresses.

In at least some aspects, the method described above can include sending, from the RPD to the CCAP-Core device, a message that includes a reference to the first plurality of IP addresses assigned to the RPD.

In at least some examples relating to the method described above, a difference between the first destination address and the second destination address can cause a router disposed between the CCAP-Core device and the RPD to select a first route for the first data packet and a second route for the second data packet.

In at least some examples relating to the method described above, the first data packet can be sent using a first Downstream PHY Interface (DEPI) tunnel and the second data packet can be sent using a second DEPI tunnel.

In at least some aspects, the method described above can include sending, from the RPD to the CCAP-Core device, a third data packet having a source address selected from the first plurality of IP addresses, and the source address can be different than the first destination address and the second destination address.

In at least some aspects, the method described above can include receiving, from the C-CAP Core device, a message that includes a reference to a second plurality of IP addresses assigned to the C-CAP Core device; and sending, from the RPD to the CCAP-Core device, a third data packet having a destination address selected from the second plurality of IP addresses assigned to the C-CAP Core device.

According to at least one example, a system for providing enhanced entropy in a converged interconnect network is provided. The system can include one or more processors and at least one computer-readable storage medium having stored thereon instructions which, when executed by the one or more processors, cause the one or more processors to: receive, by a Converged Cable Access Platform Core (CCAP-Core) device from a remote physical layer device (RPD), a message that includes a reference to a first plurality of IP addresses assigned to the RPD; send, by the CCAP-Core device to the RPD, a first data packet having a first destination IP address selected from the first plurality of IP addresses; and send, by the CCAP-Core to the RPD, a second data packet having a second destination IP address selected from the first plurality of IP addresses, wherein a difference between the first destination IP address and the second destination IP address causes a router disposed between the CCAP-Core device and the RPD to select a first route for the first data packet and a second route for the second data packet.

In at least some examples relating to the system described above, the first plurality if IP addresses can include an Internet Protocol version 6 (IPv6) prefix.

In at least some aspects, the system described above can receive, by the CCAP-Core device from the RPD, a third data packet having a source IP address selected from the first plurality of IP addresses, wherein the source IP address is different than the first destination IP address and the second destination IP address.

In at least some examples relating to the system described above, the first data packet can be sent using a first Downstream External PHY Interface (DEPI) tunnel and the second data packet can be sent using a second DEPI tunnel.

In at least some aspects, the system described above can receive, from a Dynamic Host Configuration Protocol (DHCP) server, a second plurality of Internet Protocol (IP) addresses that are assigned to the CCAP-Core device, and the first data packet can have a source address selected from the second plurality of IP addresses.

In at least some aspects, the system described above can send, to the DHCP server, a request for the second plurality of IP addresses.

According to one example, a non-transitory computer-readable storage medium for providing enhanced entropy in a converged interconnect network is provided. The non-transitory computer-readable storage medium can store instructions, which, when executed by one or more processors, cause the one or more processors to: receive, by a remote physical layer device (RPD) from a Dynamic Host Configuration Protocol (DHCP server), a first plurality of Internet Protocol (IP) addresses; send, by the RPD to a Converged Cable Access Platform Core (CCAP-Core) device, a first data packet having a first source address selected from the first plurality of IP addresses; and send, by the RPD to the CCAP-Core device, a second data packet having a second source address selected from the first plurality of IP addresses.

In at least some aspects, the non-transitory computer-readable storage medium described above can send, from the RPD to a Dynamic Host Configuration Protocol (DHCP) server, a request for the first plurality of IP addresses.

In at least some aspects, the non-transitory computer-readable storage medium described above can send, from the RPD to the CCAP-Core device, a message that includes a reference to the first plurality of IP addresses assigned to the RPD.

In at least some examples relating to the non-transitory computer-readable medium described above, a difference between the first source address and the second source address can cause a router disposed between the CCAP-Core device and the RPD to select a first route for the first data packet and a second route for the second data packet.

In at least some aspects, the non-transitory computer-readable storage medium described above can receive, from the C-CAP Core device, a message that can include a reference to a second plurality of IP addresses assigned to the C-CAP Core device, and the first data packet can have a destination address selected from the second plurality of IP addresses.

In at least some examples relating to the non-transitory computer-readable medium described above, the first plurality of IP addresses can include an Internet Protocol version 6 (IPv6) prefix.

This overview is not intended to identify key or essential features of the claimed subject matter, nor is it intended to be used in isolation to determine the scope of the claimed subject matter. The subject matter should be understood by reference to appropriate portions of the entire specification of this application, any or all drawings, and each claim.

The foregoing, together with other features and embodiments, will become more apparent upon referring to the following specification, claims, and accompanying drawings.

EXAMPLE EMBODIMENTS

A Distributed Access Architecture (DAA) relates to a configuration that decentralizes cable networks by relocating functions from the headend or hub to nodes that are located closer to the subscriber. For example, a Remote physical layer architecture (R-PHY) moves the modulation and demodulation of the cable signals to a Remote Physical Layer Device (RPD). The RPD is a component that has a network interface on one side and a radio frequency (RF) interface on the other side. RPD's functions include converting downstream signals received from a Converged Cable Access Platform Core (CCAP-Core) over a digital medium to analog for transmission to an end user's cable modem. The RPD also converts upstream analog signals that it receives from cable modems to digital for transmission to the CCAP-Core. The network between the RPD and CCAP-Core is known as a Converged Interconnect Network (CIN).

Data between the RPD and CCAP-Core is encapsulated into Data-Over-Cable Service Interface Specification (DOCSIS) frames and travels through the CIN over IP-based tunnels or pseudowires. A typical R-PHY architecture can have many individual, unicast Downstream External PHY Interface (DEPI) tunnels from the CCAP-Core to the RPD and Upstream External PHY interface (UEPI) tunnels from the RPD to the CCAP-Core.

The RPD and CCAP-Core are assigned a single Internet Protocol (IP) address and therefore each of the DEPI tunnels have the same source and destination address. Similarly, each of the UEPI tunnels will also have the same source and destination address. Furthermore, because the payload of DEPI tunnels in encrypted, routers cannot extract information beyond the source/destination address tuple for the purpose of load balancing. Consequently, an intermediate router in the CIN has minimal information to make a routing decision that can optimize load balancing. Because there is limited information to provide to the router's hash algorithm, the DEPI/DEPI flows are likely to have an affinity to one member of the router's bundle, which can result in improper load balancing.

Techniques and systems are provided for enhancing entropy in a computer network. Examples will be described below using a Converged Interconnect Network as an illustrative example. However, the systems and techniques are not limited to a CIN. For example, in some cases, the systems and techniques can be implemented in a Software-defined Wide Area Network (SD-WAN) wherein one or more routers that are part of the SD-WAN can be assigned an IPv6 prefix, which could result in additional entropy for better load balancing in routing traffic to/from the routers in the SD-WAN. The systems and techniques described herein can also be implemented in other types of networks that utilize an overlay/underlay configuration (e.g., a virtual network built on top of underlying network infrastructure).

The techniques and systems provide the ability for routers to utilize existing hash algorithms to load balance data traffic between a Remote Physical Layer Device (RPD) and a Converged Cable Access Platform Core (CCAP-Core). In one technique, the RPD can request and receive a group of Internet Protocol (IP) addresses (e.g., a prefix or block of IPv6 addresses). The RPD can use the group of IP addresses to assign a different source address to each of the data tunnels it maintains with the CCAP-Core. Upon using the different source addresses to send data to the CCAP-Core, the routers in the CIN can use the different addresses to efficiently load balance the traffic between the RPD and the CCAP-Core.

In another technique, the CCAP-Core can utilize a block of IPv6 addresses that are assigned to an RPD to send information to an RPD. For example, the RPD can utilize a control plane to communicate the set of addresses that it has been assigned to the CCAP-Core. The CCAP-Core can then use the set of addresses to assign a different destination address to each of the data tunnels it maintains with the RPD. This technique can also be used to induce entropy that can result in more efficient load balancing by routers in the CIN.

In another example, the CCAP-Core can request and receive a group of IP addresses (e.g., a prefix or block of IPv6 addresses). The CCAP-Core can use the block of IPv6 addresses to assign a different source address to each of the data tunnels it maintains with the RPD in order to induce further entropy for routers in the CIN. The additional entropy can result in more efficient load balancing by routers throughout the CIN.

Figure 2:
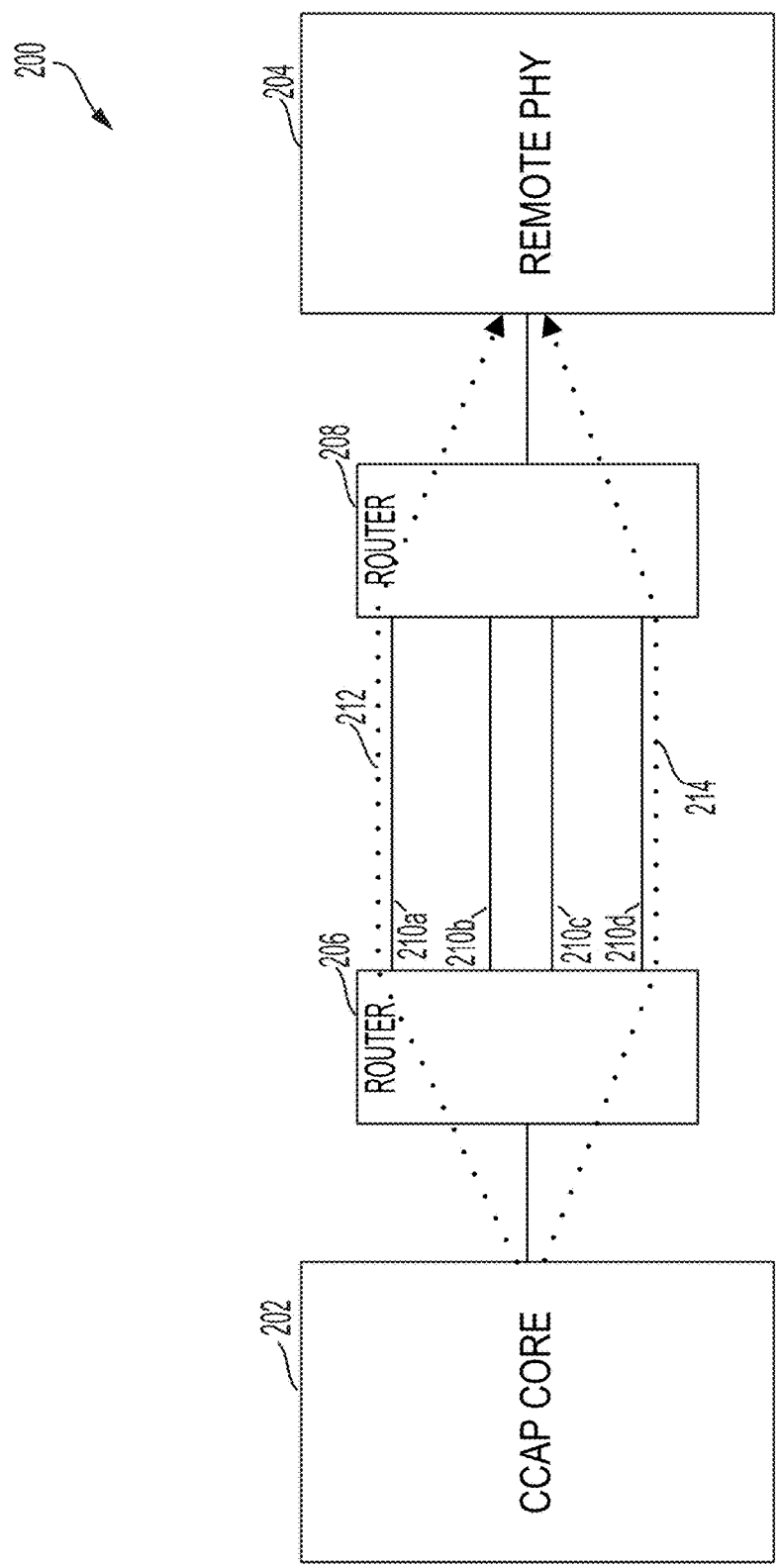
FIG. 2 is a block diagram illustrating a second example network architecture, in accordance with some examples.
Figure 3:
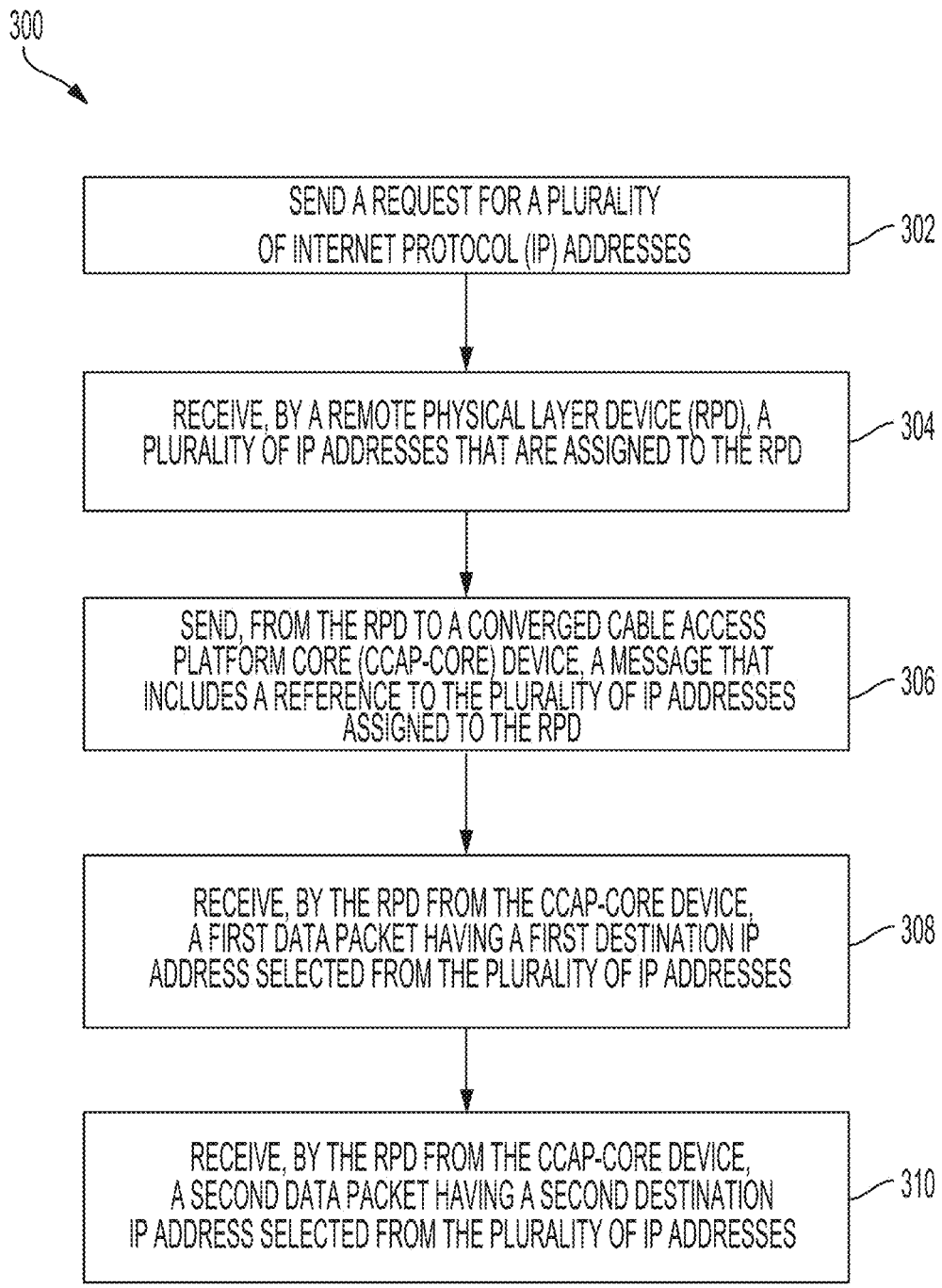
FIG. 3 is a flowchart illustrating an example method for providing enhanced entropy in a converged interconnect network, in accordance with some examples.
Figure 4:
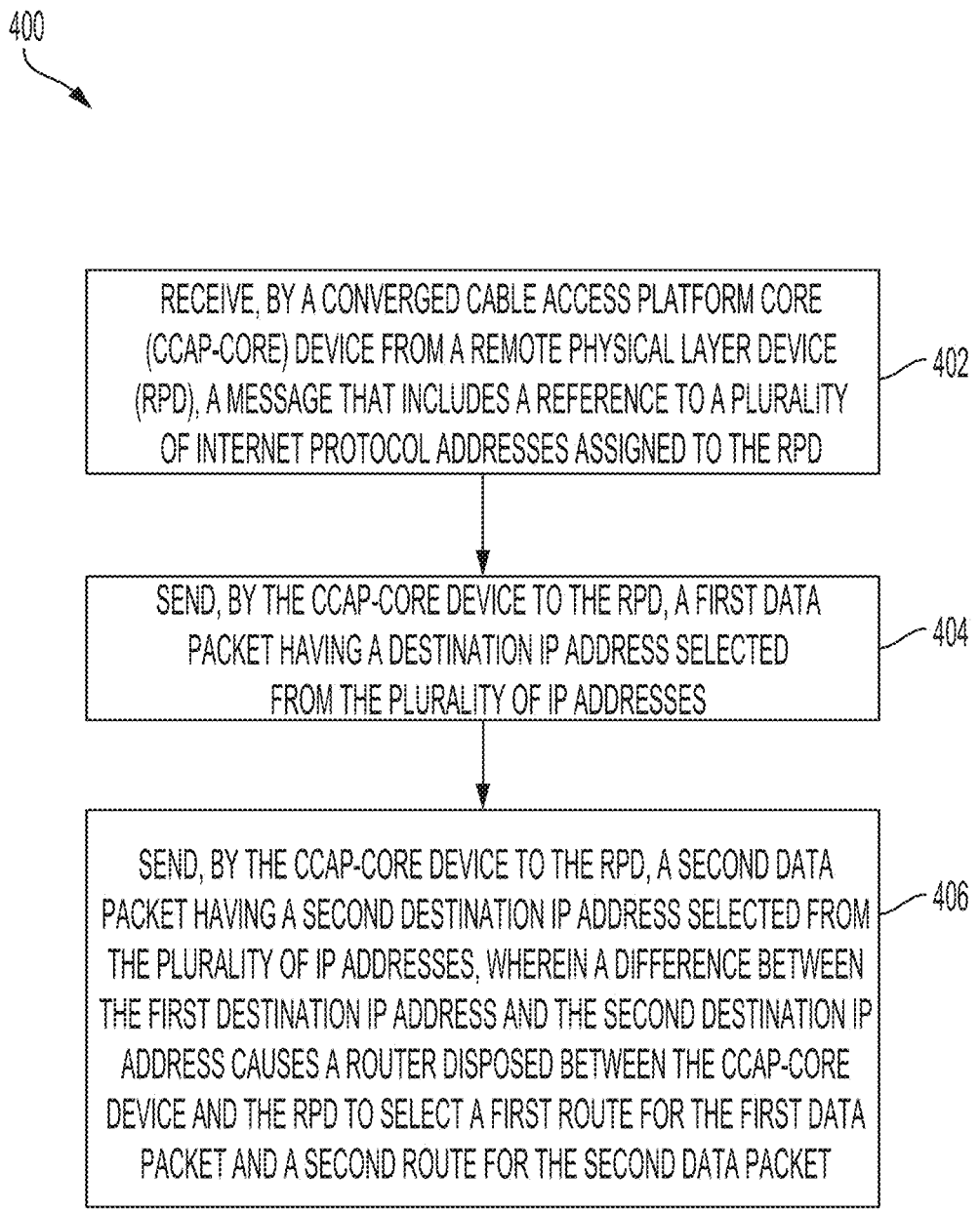
FIG. 4 is a flowchart illustrating another example method for providing enhanced entropy in a converged interconnect network, in accordance with some examples.
Figure 5:
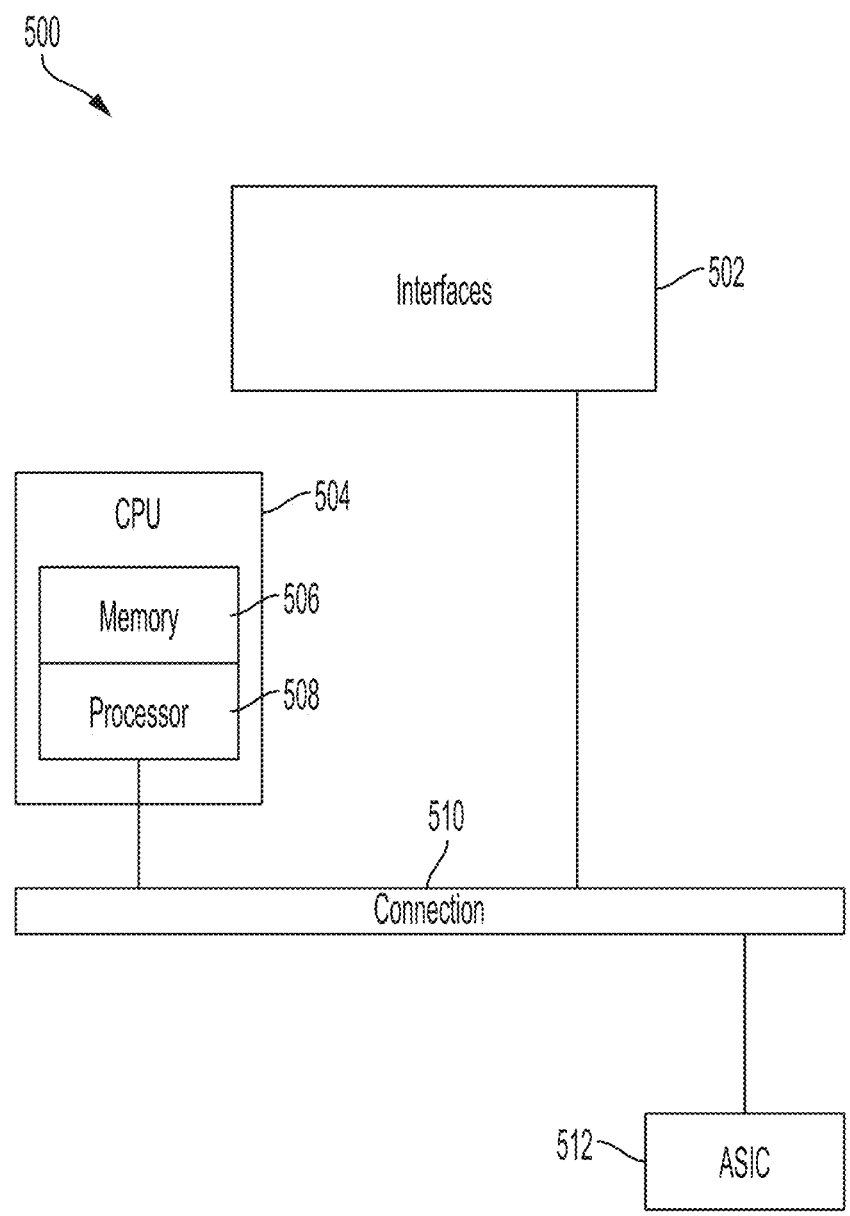
FIG. 5 illustrates an example network device in accordance with some examples.
Figure 6:
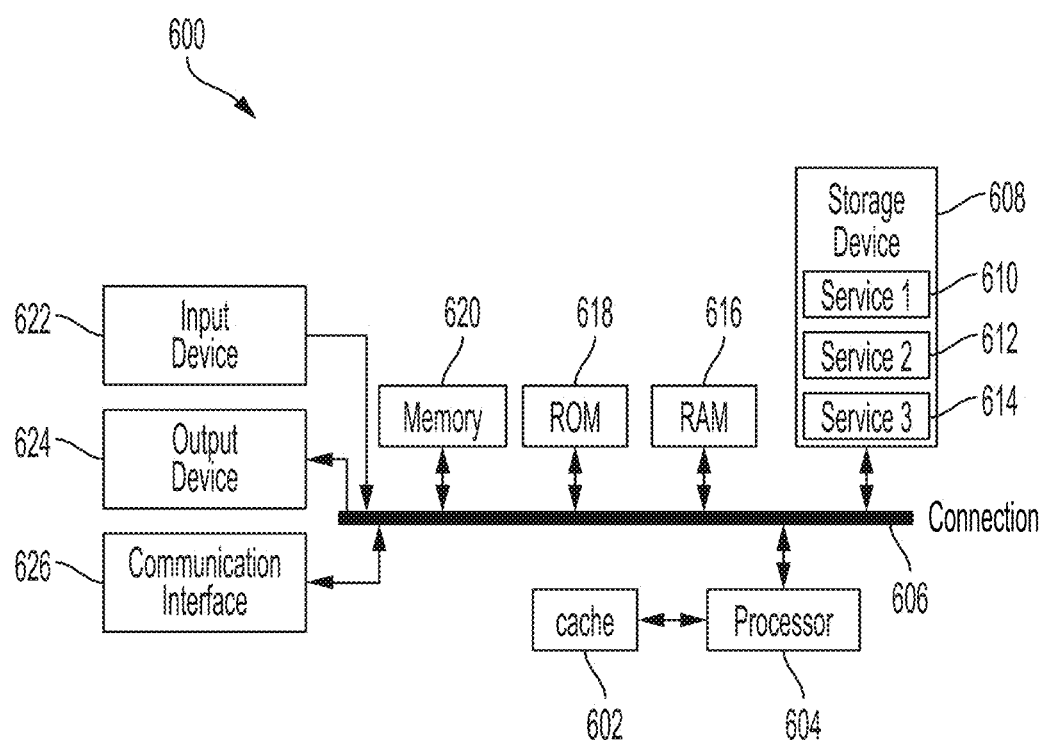
FIG. 6 illustrates an example computing device in accordance with some examples.

As further described below, the disclosed technology provides systems, methods, and computer-readable media for providing enhanced entropy in a Converged Interconnect Network. The present technology will be described in the subsequent disclosure as follows. The discussion begins with a description of example computer environments, systems, and techniques for providing enhanced entropy in a CIN, as illustrated in FIGS. 1-2. A description of example methods for providing enhanced entropy, as illustrated in FIGS. 3-4, will then follow. The discussion concludes with a description of an example network device, as illustrated in FIG. 5, and an example computing device, as illustrated in FIG. 6. The disclosure now turns to FIG. 1.

FIG. 1 is a block diagram illustrating an example network architecture 100, in accordance with some examples. In some aspects, the network architecture 100 can include a Converged Cable Access Platform Core (CCAP-Core) 102 and a Remote Physical Layer Device (RPD) 104. CCAP-Core 102 and RPD 104 together can formulate a cable modem termination system (CMTS), which can be used to provide high speed data services to cable subscribers (e.g., subscriber 112).

In some examples, CCAP-Core 102 and RPD 104 can communicate over a Converged Interconnect Network (CIN) 106. CIN 106 can be an Internet Protocol (IP) routed network that can include Layer 2 switches and Layer 3 routers. In some aspects, CCAP-Core 102 and RPD 104 can utilize Data-Over-Cable Service Interface Specification (DOCSIS) protocol to transfer data over CIN 106. For instance, DOCSIS can be used to send digital video and/or data between CCAP-Core 102 and RPD 104. In some configurations, data can be modulated onto a radio frequency (RF) carrier or channel using Quadrature Amplitude Modulation (QAM) techniques. Data can be encapsulated into DOCSIS frames and can travel through CIN 106 over IP-based tunnels or pseudowires.

In some cases, CCAP-Core 102 can include one or more hardware and/or software components (e.g., a CMTS Core) for implementing DOCSIS protocol communication. For example, CCAP-Core 102 can perform DOCSIS media access control (MAC) and upper layer protocols, such as signaling functions, downstream and upstream bandwidth scheduling, and DOCSIS framing. In some cases, CCAP-Core 102 can be located at the hub or at the headend facility. In other examples, CCAP-Core 102 can be located at a regional data center.

In some examples, RPD 104 can have a network interface that is configured to communicate with CCAP-Core 102 via CIN 106. For example, RPD 104 can have one or more Ethernet ports or passive optical network (PON) ports. RPD 104 can also have one or more RF interfaces that are configured to communicate with customer premises equipment such as cable modem 110.

In some aspects, RPD 104 can provide Layer 1 physical layer (PHY) conversion, Layer 2 MAC conversion, and/or Layer 3 pseudowire support. For example, RPD 104 can convert downstream DOCSIS data, MPEG video, and/or any other signals received from CCAP-Core 102 over a digital medium such as Ethernet or PON to analog for transmission over RF or linear optics to cable modem 110. In further aspects, RPD 104 can convert upstream analog RF or linear optics signals received from cable modem 100 to a digital format for transmission (e.g., using DOCSIS framing) over CIN 106 to CCAP-Core 102.

In some examples, CCAP-Core 102 can communicate with RPD 104 over CIN 106 using a Remote Downstream External PHY Interface (R-DEPI). In some aspects, R-DEPI may include one or more IP pseudowires that can contain a data path (e.g., for DOCSIS frames, video packets, and/or any other data), as well as a control path for configuring sessions. In some cases, IP pseudowires that formulate R-DEPI can be configured according to Layer 2 Tunnelling Protocol v3 (L2TPv3) and the DOCSIS frames inside the tunnel can be encrypted.

In further aspects, RPD 104 can communicate with CCAP-Core 102 over CIN 106 using a Remote Upstream External PHY Interface (R-UEPI). For instance, R-UEPI may include one or more IP pseudowires that can contain a data path for data (e.g., DOCSIS frames) and a control path for setting up, maintaining, and tearing down sessions. In some cases, IP pseudowires that formulate R-UEPI can be configured according to Layer 2 Tunnelling Protocol v3 (L2TPv3) and the DOCSIS frames inside the tunnel can be encrypted.

In some configurations, network architecture 100 can include Dynamic Host Configuration Protocol (DHCP) server 108. DHCP server 108 may be configured to communicate with CCAP-Core 102 and RPD 104 over CIN 106. In some cases, CCAP-Core 102 may be configured to perform DHCP relay functions. In further examples, the DHCP relay may be hosted by a Layer 2 switch, by a Layer 3 router, by DHCP server 108, or some other network device. In some configurations, there may be zero or more Layer 2 switches and/or Layer 3 routers between each of the elements in network architecture 100 (e.g., between RPD 104 and DHCP server 108; between CCAP-Core 102 and DHCP server 108; etc.).

In some examples, RPD 104 may operate using two or more IP addresses that can be configured by a network operator or can be obtained from DHCP server 108. In some aspects, RPD 104 may be configured to obtain a group of IP addresses from DHCP server 108. For instance, RPD 104 may issue a broadcast DHCP discovery message when it needs to obtain an IP address. In response, RPD 104 may receive a unicast DHCP offer from a DHCP agent that includes the address of one or more DHCP servers (e.g., DHCP server 108). RPD 104 can send a DHCP request to DHCP server 108 requesting two or more IP addresses. In some aspects, RPD 104 can request a block of IP addresses. In response, DHCP server 108 may send a response that includes a block of IPv6 addresses that are assigned to RPD 104. For example, DHCP server 108 may utilize DHCPv6 prefix delegation to assign RPD 104 an IPv6 subnet or address range that is designated by an IPv6 prefix (e.g., an IPv6 address block with 126 bits in the prefix can be indicated by/126 and can contain 4 addresses).

In some examples, CCAP-Core 102 may operate using two or more IP addresses that can be configured by a network operator or can be obtained from DHCP server 108. In some aspects, CCAP-Core 102 may be configured to communicate with DHCP server 108 over CIN 106 in order to obtain a group of IP addresses. For instance, CCAP-Core 102 may be assigned a block of IP addresses designated by an IPv6 prefix.

In some cases, RPD 104 may send a message to CCAP-Core 102 (e.g., via control plane) that includes a reference to the block of IP addresses assigned to RPD 104. In other cases, CCAP-Core 102 may obtain the set of addresses that are assigned to RPD 104 from DHCP server 108. In some examples, CCAP-Core 102 may send a message to RPD 104 that includes a reference to the block of IP addresses assigned to CCAP-Core 102. In other aspects, RPD 104 may obtain the IP addresses for CCAP-Core 102 from DHCP server 108.

CCAP-Core 102 and RPD 104 can establish one or more R-DEPI and R-UEPI tunnels that can travel over CIN 106. In some aspects, each tunnel can utilize a different IP address from the block of IP addresses assigned to CCAP-Core 102 and/or RPD 104. For example, CCAP-Core 102 can establish two or more distinct R-DEPI tunnels each having a different destination IP address that are selected from the block of IP addresses assigned to RPD 104. In another example, CCAP-Core 102 can establish one or more R-DEPI tunnels each having different source IP addresses selected from the group of IP addresses assigned to CCAP-Core 102.

In some aspects, RPD 104 can establish two or more distinct R-UEPI tunnels each having a different destination IP address that are selected from the block of IP addresses assigned to CCAP-Core 102. In another example, RPD 104 can establish one or more R-UEPI tunnels each having different source IP addresses selected from the group of IP addresses assigned to RPD 104.

FIG. 2 is a block diagram illustrating an example network architecture 200, in accordance with some examples. In some cases, network architecture 200 can include CCAP-Core 202 and RPD 204. As discussed in connection with network architecture 100, CCAP-Core 202 and RPD 204 can communicate over a Converged Interconnect Network (CIN) that can include one or more Layer 3 routers, such as router 206 and router 208.

In some cases, CCAP-Core 202 and/or RPD 204 can be assigned (or otherwise configured to use) two or more Internet Protocol (IP) addresses. In some examples, CCAP-Core 202 and RPD 204 can be assigned an IPv6 prefix that defines a block of two or more IPv6 addresses. In some aspects, CCAP-Core 202 can communicate with RPD 204 by utilizing one or more R-DEPI tunnels such as tunnel 212 and tunnel 214.

In some configurations, R-DEPI tunnels can be used to send encrypted DOCSIS frames from CCAP-Core 202 to RPD 204. In some cases, RPD 204 can communicate with CCAP-Core 202 by utilizing one or more R-UEPI tunnels (not illustrated) that can be used to send DOCSIS frames from RPD 204 to CCAP-Core 202.

Network architecture 200 can include router 206 and router 208 as part of a CIN that can be configured to route data traffic between CCAP-Core 202 and RPD 204. As illustrated, router 206 and router 208 can utilize one or more of links 210*a*, 210*b*, 210*c*, and 210*d* to route data traffic between CCAP-Core 202 and RPD 204.

Router 206 and router 208 can be configured to implement one or more routing algorithms and/or load balancing algorithms. For example, router 206 and router 208 can be configured to implement Equal-Cost Multi-Path (ECMP) load balancing, link aggregation (LAG), and/or any other suitable algorithm for routing traffic in an IP network.

In some instances, router 206 and router 208 may implement load balancing algorithms that utilize a hash function to determine an appropriate route for data traffic between CCAP-Core 202 and RPD 204. In some cases, input to the hash function can include the source IP address and/or the destination IP address. Consequently, CCAP-Core 202 and/or RPD 204 can introduce entropy by configuring their respective R-DEPI and R-UEPI tunnels using different source and/or destination IP addresses selected from the block of IP addresses assigned to each device.

For example, based on the source IP address and/or the destination IP address associated with tunnel 212, router 206 can determine that link 210*a* is appropriate for routing data associated with tunnel 212. In a further example, based on a source IP address and/or destination IP address associated with tunnel 214 that is different from the source IP address and/or destination IP address associated with tunnel 212, router 206 can determine that link 210*d* is appropriate for routing data associated with tunnel 214.

Having disclosed example systems, components and concepts, the disclosure now turns to the example methods 300 and 400 for inducing entropy in a converged interconnect network, as shown in FIGS. 3 and 4. The steps outlined herein are non-limiting examples provided for illustration purposes, and can be implemented in any combination thereof, including combinations that exclude, add, or modify certain steps.

FIG. 3 is a flowchart illustrating an example method 300 for inducing entropy in a converged interconnect network. At block 302, the method can include sending, by a remote physical layer device (RPD), a request for a plurality of Internet Protocol (IP) addresses. In some examples, the request can be sent to a Dynamic Host Configuration Protocol (DHCP) server.

At block 304, the method 300 can include receiving, by the RPD, a plurality of IP addresses that are assigned to the RPD. In some cases, the plurality of IP addresses can include a subnet or a block/range of Internet Protocol version 6 addresses, which can be designated by an IPv6 prefix.

At block 306, the method 300 can include sending, from the RPD to a Converged Cable Access Platform Core (CCAP-Core) device, a message that includes a reference to the plurality of IP addresses assigned to the RPD. In some cases, the CCAP-Core device may obtain the plurality of IP addresses assigned to the RPD from a DHCP server. In some implementations, the CCAP-Core device can use the plurality of IP addresses assigned to the RPD to configure one or more Remote Downstream External PHY Interface (R-DEPI) tunnels. For example, the CCAP-Core device can select a different destination address (from the range of addresses assigned to the RPD) for each of the R-DEPI tunnels.

At block 308, the method 300 can include receiving, by the RPD from the CCAP-Core device, a first data packet having a first destination IP address selected from the plurality of IP addresses. At block 310, the method 300 can include receiving, by the RPD from the CCAP-Core, a second data packet having a second destination IP address selected from the plurality of IP addresses. In some aspects, a difference between the first destination IP address and the second destination IP address can induce entropy and cause a router disposed between the CCAP-Core device and the RPD to select a first route for the first data packet and a second route for the second data packet.

In some aspects, the RPD can induce further entropy by sending a data packet to the CCAP-Core using a source address that is selected from the plurality of IP addresses and is different than the first destination IP address and the second destination IP address. In some examples, the RPD can receive a message from the CCAP-Core device with an indication of a second plurality of IP addresses that are assigned to the CCAP-Core. The RPD may then select different destination IP addresses for it R-UEPI tunnels from the second plurality of IP addresses.

FIG. 4 is a flowchart illustrating an example method 400 for inducing entropy in a converged interconnect network. At block 402, the method 400 can include receiving, by a CCAP-Core device from a RPD, a message that includes a reference to a plurality of IP addresses that are assigned to the RPD. In some examples, the plurality of IP addresses can include a subnet or an IPv6 prefix that defines a block of IP addresses.

At block 404, the method 400 can include sending, by the CCAP-Core device to the RPD, a first data packet having a first destination IP address selected from the plurality of IP addresses. In some cases, the data packet can include encrypted DOCSIS frames that are sent using an R-DEPI tunnel.

At block 406, the method 400 can include sending, by the CCAP-Core device to the RPD, a second data packet having a second destination IP address selected from the plurality of IP addresses, wherein a difference between the first destination IP address and the second destination IP address causes a router disposed between the CCAP-Core device and the RPD to select a first route for the first data packet and a second route for the second data packet. In some cases, the first data packet can be sent using a first R-DEPI tunnel and the second data packet can be sent using a second R-DEPI tunnel.

In some aspects, the CCAP-Core device can receive a data packet from the RPD that has a source IP address that is selected from the plurality of IP addresses and is different than the first destination IP address and the second destination IP address.

In some cases, the CCAP-Core device may be configured to use a block of IP addresses (e.g., a subnet or IPv6 prefix). For example, the CCAP-Core device may obtain a block of IPv6 addresses from a DHCP server. In order to introduce additional entropy in the CIN, the CCAP-Core device can select different source addresses for the data packets (e.g., the first data packet and/or the second data packet) and/or tunnels to the RPD.

The disclosure now turns to FIGS. 5 and 6, which illustrate example network devices and computing devices, such as switches, routers, nodes, servers, client devices, orchestrators, and so forth.

FIG. 5 illustrates an example network device 500 suitable for performing switching, routing, load balancing, and other networking operations. Network device 500 includes a central processing unit (CPU) 504, interfaces 502, and a bus 510 (e.g., a PCI bus). When acting under the control of appropriate software or firmware, the CPU 504 is responsible for executing packet management, error detection, and/or routing functions. The CPU 504 preferably accomplishes all these functions under the control of software including an operating system and any appropriate applications software. CPU 504 may include one or more processors 508, such as a processor from the INTEL X86 family of microprocessors. In some cases, processor 508 can be specially designed hardware for controlling the operations of network device 500. In some cases, a memory 506 (e.g., non-volatile RAM, ROM, etc.) also forms part of CPU 504. However, there are many different ways in which memory could be coupled to the system.

The interfaces 502 are typically provided as modular interface cards (sometimes referred to as "line cards"). Generally, they control the sending and receiving of data packets over the network and sometimes support other peripherals used with the network device 500. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HS SI interfaces, POS interfaces, FDDI interfaces, WIFI interfaces, 3G/4G/5G cellular interfaces, CAN BUS, LoRA, Radio Frequency (RF) interfaces, DOCSIS interfaces, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master CPU (e.g., 504) to efficiently perform routing computations, network diagnostics, security functions, etc.

Although the system shown in FIG. 5 is one specific network device of the present disclosure, it is by no means the only network device architecture on which the present disclosure can be implemented. For example, an architecture having a single processor that handles communications as well as routing computations, etc., is often used. Further, other types of interfaces and media could also be used with the network device 500.

Regardless of the network device's configuration, it may employ one or more memories or memory modules (including memory 506) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 506 could al so hold various software containers and virtualized execution environments and data.

The network device 500 can also include an application-specific integrated circuit (ASIC), which can be configured to perform routing and/or switching operations. The ASIC can communicate with other components in the network device 500 via the bus 510, to exchange data and signals and coordinate various types of operations by the network device 500, such as routing, switching, and/or data storage operations, for example.

In some examples, the processes described herein (e.g., process 300, 400, and/or other processes described herein) may be performed by a computing device or apparatus. In one example, the process 300 can be performed by a computing device with the computing system 600 shown in FIG. 6. For instance, CCAP-Core 102 and/or RPD 104 can include a computer architecture similar to that of computing system 600 and can implement the operations of process 300.

FIG. 6 illustrates an example computing system 600 for implementing certain aspects of the present technology. In this example, the components of the system 600 are in electrical communication with each other using a connection 606, such as a bus. The system 600 includes a processing unit (CPU or processor) 604 and a connection 606 that couples various system components including a memory 620, such as read only memory (ROM) 618 and random access memory (RAM) 616, to the processor 604.

The system 600 can include a cache of high-speed memory connected directly with, in close proximity to, or integrated as part of the processor 604. The system 600 can copy data from the memory 620 and/or the storage device 608 to cache 602 for quick access by the processor 604. In this way, the cache can provide a performance boost that avoids processor 604 delays while waiting for data. These and other modules can control or be configured to control the processor 604 to perform various actions. Other memory 620 may be available for use as well. The memory 620 can include multiple different types of memory with different performance characteristics. The processor 604 can include any general purpose processor and a hardware or software service, such as service 1 610, service 2 612, and service 3 614 stored in storage device 608, configured to control the processor 604 as well as a special-purpose processor where software instructions are incorporated into the actual processor design. The processor 604 may be a completely self-contained computing system, containing multiple cores or processors, a bus, memory controller, cache, etc. A multi-core processor may be symmetric or asymmetric.

To enable user interaction with the computing system 600, an input device 622 can represent any number of input mechanisms, such as a microphone for speech, a touch-sensitive screen for gesture or graphical input, keyboard, mouse, motion input, speech and so forth. An output device 624 can also be one or more of a number of output mechanisms known to those of skill in the art. In some instances, multimodal systems can enable a user to provide multiple types of input to communicate with the computing system 600. The communications interface 626 can generally govern and manage the user input and system output. There is no restriction on operating on any particular hardware arrangement and therefore the basic features here may easily be substituted for improved hardware or firmware arrangements as they are developed.

Storage device 608 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 616, read only memory (ROM) 618, and hybrids thereof.

The storage device 608 can include services 610, 612, 614 for controlling the processor 604. Other hardware or software modules are contemplated. The storage device 608 can be connected to the connection 606. In one aspect, a hardware module that performs a particular function can include the software component stored in a computer-readable medium in connection with the necessary hardware components, such as the processor 604, connection 606, output device 624, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A system for providing enhanced entropy in a Converged Interconnect Network comprising:
   one or more processors; and
   at least one computer-readable storage medium having stored thereon instructions which, when executed by the one or more processors, cause the one or more processors to:
     receive, by a Converged Cable Access Platform Core (CCAP-Core) device, a message that includes a reference to a first plurality of Internet Protocol (IP) addresses assigned to a Remote Physical Layer Device (RPD);
     send, by the CCAP-Core device to the RPD, a first data packet having a first destination IP address selected from the first plurality of IP addresses; and
     send, by the CCAP-Core device to the RPD, a second data packet having a second destination IP address selected from the first plurality of IP addresses, wherein a difference between the first destination IP address and the second destination IP address induces entropy and causes a router disposed between the CCAP-Core device and the RPD to select a first route for the first data packet and a second route for the second data packet.

2. The system of claim 1, wherein the first plurality of IP addresses comprises an Internet Protocol version 6 (IPv6) prefix.

3. The system of claim 1, the at least one computer-readable storage medium storing instructions which, when executed by the one or more processors, cause the system to:
   receive, by the CCAP-Core device from the RPD, a third data packet having a source IP address selected from the first plurality of IP addresses, wherein the source IP address is different than the first destination IP address and the second destination IP address.

4. The system of claim 1, wherein the first data packet is sent using a first Downstream External PHY Interface (DEPI) tunnel and the second data packet is sent using a second DEPI tunnel.

5. The system of claim 1, the at least one computer-readable storage medium storing instructions which, when executed by the one or more processors, cause the system to:
   receive, from a Dynamic Host Configuration Protocol (DHCP) server, a second plurality of Internet Protocol (IP) addresses that are assigned to the CCAP-Core device, wherein the first data packet has a source IP address selected from the second plurality of IP addresses.

6. The system of claim 5, the at least one computer-readable storage medium storing instructions which, when executed by the one or more processors, cause the system to:
   send, to the DHCP server, a request for the second plurality of IP addresses.

7. The system of claim 1, the operations further comprising:
   assign by the CCAP-Core a first of the IP destination addresses to a first Remote Downstream External PHY Interface (R-DEPI) data tunnel between the CCAP-Core and the RPD, and a second of the IP destination addresses to a second R-DEPI data tunnel between CCAP-Core and the RPD;
   the first route for the first data packet being based on the first R-DEPI data tunnel and the second route for the second data packet being based on the first R-DEPI data tunnel.

8. A non-transitory computer-readable storage media having stored thereon instructions which, when executed by the one or more processors, cause the one or more processors to perform operations comprising:
   receive, by a Converged Cable Access Platform Core (CCAP-Core) device, a message that includes a reference to a first plurality of Internet Protocol (IP) addresses assigned to a Remote Physical Layer Device (RPD);
   send, by the CCAP-Core device to the RPD, a first data packet having a first destination IP address selected from the first plurality of IP addresses; and
   send, by the CCAP-Core device to the RPD, a second data packet having a second destination IP address selected from the first plurality of IP addresses, wherein a difference between the first destination IP address and the second destination IP address induces entropy and causes a router disposed between the CCAP-Core device and the RPD to select a first route for the first data packet and a second route for the second data packet.

9. The non-transitory computer-readable storage media of claim 8, wherein the first plurality of IP addresses comprises an Internet Protocol version 6 (IPv6) prefix.

10. The non-transitory computer-readable storage media of claim 8, the operations further comprising:
    receive, by the CCAP-Core device from the RPD, a third data packet having a source IP address selected from the first plurality of IP addresses, wherein the source IP address is different than the first destination IP address and the second destination IP address.

11. The non-transitory computer-readable storage media of claim 8, wherein the first data packet is sent using a first Downstream External PHY Interface (DEPI) tunnel and the second data packet is sent using a second DEPI tunnel.

12. The non-transitory computer-readable storage media of claim 8, the operations further comprising:
    receive, from a Dynamic Host Configuration Protocol (DHCP) server, a second plurality of Internet Protocol (IP) addresses that are assigned to the CCAP-Core device, wherein the first data packet has a source IP address selected from the second plurality of IP addresses.

13. The non-transitory computer-readable storage media of claim 12, the operations further comprising:
send, to the DHCP server, a request for the second plurality of IP addresses.

14. The non-transitory computer-readable storage media of claim 8, the operations further comprising:
assign by the CCAP-Core a first of the IP destination addresses to a first Remote Downstream External PHY Interface (R-DEPI) data tunnel between the CCAP-Core and the RPD, and a second of the IP destination addresses to a second R-DEPI data tunnel between CCAP-Core and the RPD;
the first route for the first data packet being based on the first R-DEPI data tunnel and the second route for the second data packet being based on the first R-DEPI data tunnel.

15. A method, comprising:
receiving, by a Converged Cable Access Platform Core (CCAP-Core) device, a message that includes a reference to a first plurality of Internet Protocol (IP) addresses assigned to a Remote Physical Layer Device (RPD);
sending, by the CCAP-Core device to the RPD, a first data packet having a first destination IP address selected from the first plurality of IP addresses; and
sending, by the CCAP-Core device to the RPD, a second data packet having a second destination IP address selected from the first plurality of IP addresses, wherein a difference between the first destination IP address and the second destination IP address induces entropy and causes a router disposed between the CCAP-Core device and the RPD to select a first route for the first data packet and a second route for the second data packet.

16. The method of claim 15, wherein the first plurality of IP addresses comprises an Internet Protocol version 6 (IPv6) prefix.

17. The method of claim 15, the operations further comprising:
receiving, by the CCAP-Core device from the RPD, a third data packet having a source IP address selected from the first plurality of IP addresses, wherein the source IP address is different than the first destination IP address and the second destination IP address.

18. The method of claim 15, the operations further comprising:
receiving, from a Dynamic Host Configuration Protocol (DHCP) server, a second plurality of Internet Protocol (IP) addresses that are assigned to the CCAP-Core device, wherein the first data packet has a source IP address selected from the second plurality of IP addresses.

19. The method of claim 18, the operations further comprising:
sending, to the DHCP server, a request for the second plurality of IP addresses.

20. The method of claim 15, the operations further comprising:
assigning by the CCAP-Core a first of the IP destination addresses to a first Remote Downstream External PHY Interface (R-DEPI) data tunnel between the CCAP-Core and the RPD, and a second of the IP destination addresses to a second R-DEPI data tunnel between CCAP-Core and the RPD;
the first route for the first data packet being based on the first R-DEPI data tunnel and the second route for the second data packet being based on the first R-DEPI data tunnel.

* * * * *